United States Patent
Taki

(10) Patent No.: US 10,093,139 B2
(45) Date of Patent: Oct. 9, 2018

(54) TIRE-PRESSURE SENSOR UNIT, A TIRE-PRESSURE NOTIFICATION DEVICE, AND VEHICLE

(71) Applicant: TOYOTA JIDOSHA KABUSHIKI KAISHA, Toyota-shi, Aichi (JP)

(72) Inventor: Yuji Taki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 297 days.

(21) Appl. No.: 15/011,617

(22) Filed: Jan. 31, 2016

(65) Prior Publication Data

US 2016/0229236 A1 Aug. 11, 2016

(30) Foreign Application Priority Data

Feb. 6, 2015 (JP) .................................. 2015-022044

(51) Int. Cl.
*G01L 3/00* (2006.01)
*B60C 23/04* (2006.01)

(52) U.S. Cl.
CPC ...... *B60C 23/0488* (2013.01); *B60C 23/0416* (2013.01); *B60C 23/0462* (2013.01); *B60C 23/0489* (2013.01)

(58) Field of Classification Search
None
See application file for complete search history.

(56) References Cited

U.S. PATENT DOCUMENTS

| | | | | |
|---|---|---|---|---|
| 8,072,319 B2 * | 12/2011 | Buck | ................... | B60C 23/0415 340/10.1 |
| 8,279,055 B2 * | 10/2012 | Isomura | .............. | B60C 23/0408 340/442 |
| 8,299,908 B2 * | 10/2012 | Isomura | .............. | B60C 23/0415 340/442 |
| 9,180,742 B2 * | 11/2015 | Kosugi | ............... | B60C 23/0416 |
| 9,278,589 B2 * | 3/2016 | Laifenfeld | .......... | B60C 23/0437 |
| 9,776,461 B2 * | 10/2017 | Okada | ................. | B60C 23/0462 |
| 2006/0001533 A1 * | 1/2006 | Bessho | ............... | B60C 23/0416 340/442 |
| 2014/0167950 A1 | 6/2014 | Shima et al. | | |
| 2017/0050478 A1 * | 2/2017 | Ijima | ....................... | B60C 23/04 |

FOREIGN PATENT DOCUMENTS

JP 2010-143485 A 7/2010
WO 2012/147396 A1 11/2012

\* cited by examiner

*Primary Examiner* — Peter Macchiarolo
*Assistant Examiner* — Jermaine Jenkins
(74) *Attorney, Agent, or Firm* — Oliff PLC

(57) ABSTRACT

It should be enabled to transmit tire-pressure information also on a spare wheel to a tire-pressure notification device, while suppressing battery consumption. A transmission controller of a sensor unit makes a transmitter periodically transmit wheel information, when an acceleration Gx detected by an acceleration sensor is larger than a running-judgment threshold value 5G. The transmission controller accumulates a point P set up according to the acceleration Gx in a predetermined period when the acceleration Gx is not more than the running-judgment threshold value 5G, and makes the transmitter transmit the wheel information when an accumulated value of the point P accumulated in the predetermined period is larger than a running-track-record-judgment threshold value.

13 Claims, 7 Drawing Sheets

TIRE-PRESSURE SENSOR UNIT, A TIRE-PRESSURE NOTIFICATION DEVICE, AND VEHICLE

TECHNICAL FIELD

The present invention relates to a tire-pressure sensor unit which is fixed to a wheel and transmits tire-pressure information representing a tire pressure as a radio signal, a tire-pressure notification device which receives the tire-pressure information and notifies it to a driver, and a vehicle which carries them.

BACKGROUND ART

Conventionally, a tire-pressure monitor system (Tire Pressure Monitoring System: TPMS) which informs a driver of tire-pressure information has been known. The tire-pressure monitor system comprises a tire-pressure sensor unit (hereafter, will be referred to as a sensor unit) which detects a tire pressure for each wheel, and is configured to transmit tire-pressure information as a radio signal from this sensor unit and to receive the radio signal with a tire-pressure notification device disposed on the vehicle body side to acquire the tire-pressure information. When judged that the tire pressure has been decreased based on the received tire-pressure information, the tire-pressure notification device displays that on an annunciator and notifies it to the driver.

Since the sensor unit does not usually comprise a reception function, it cannot be configured to transmit the tire-pressure information in response to a demand from the tire-pressure notification device. For this reason, in the tire-pressure monitor system, the tire-pressure information is unilaterally transmitted from the sensor unit in a predetermined period. The sensor unit has a battery built therein and transmits the radio signal by using this battery as a power supply. For this reason, it is required that the battery life of the sensor unit should be secured to the same extent as the life time of the vehicle.

Since the sensor unit is attached to an air supply valve portion, it is small and the size of the battery to be built in is also restricted. For this reason, it is necessary to transmit a radio signal so that battery consumption may be suppressed as much as possible. Although the battery life can be lengthened when the transmission period (interval) of the radio signal is lengthened, the acquisition of the tire-pressure information by the tire-pressure notification device will get delayed.

For instance, a tire-pressure monitor system which transmits tire-pressure information in a constant period only when judged that a vehicle is running is proposed in the Patent Document 1 (PTL1). A sensor unit disposed in this tire-pressure monitor system comprises an acceleration sensor in addition to a pneumatic sensor, and it judges that the vehicle is running (wheel is rotating) when acceleration in the direction of centrifugal force detected by this acceleration sensor is larger than a threshold value, and transmits tire-pressure information periodically. Thereby, the battery consumption during the vehicle is stopping can be suppressed.

CITATION LIST

Patent Literature

[PTL1] International Publication No. 2012-147396

SUMMARY OF INVENTION

However, the sensor unit may be disposed not only in a running wheel, but also in a spare wheel. The spare wheel does not rotate even when the vehicle is running. For this reason, the device proposed in the Patent Document 1 (PTL1) cannot detect the rotation of the spare wheel with an acceleration sensor, and therefore cannot transmit the tire-pressure information on the spare wheel.

The objective of the present invention has been made in order to cope with the above-mentioned issue, and it is in enabling it to transmit tire-pressure information also on a spare wheel to a tire-pressure notification device, while suppressing battery consumption.

In order to attain the above-mentioned objective, the feature of the present invention is in that:

a tire-pressure sensor unit being fixed to and disposed on a wheel of a vehicle and comprising:

a pneumatic sensor (11) which detects a tire pressure, an acceleration sensor (13) which detects acceleration generated by rotation of a wheel, a transmitter (16) for transmitting wheel information which is information including tire-pressure information representing the tire pressure detected by said pneumatic sensor and an inherent sensor ID as a radio signal, a transmission control means (15) which controls a transmission timing of said wheel information by said transmitter based on the acceleration detected by said acceleration sensor, and a battery (17) disposed as an internal electrical power source, wherein;

said transmission control means (15) comprises:

a first transmission control means (S11, S13 to S16) for making said transmitter periodically transmit said wheel information when the acceleration detected by said acceleration sensor is larger than a running-judgment threshold value, an accumulation means (S19 to S24) for accumulating an acceleration-correlated amount (P) which is correlated with the magnitude of the acceleration detected by said acceleration sensor and acquiring an accumulated value thereof when said acceleration is not more than said running-judgment threshold value, a second transmission control means (S25 to S28) for making said transmitter transmit said wheel information when it is estimated that there is a track record that said vehicle has run based on the comparison result between said acquired accumulated value and a running-track-record-judgment threshold value.

A tire-pressure sensor unit according to the present invention is fixed to and disposed on a wheel of a vehicle. The tire-pressure sensor unit comprises a pneumatic sensor, an acceleration sensor, a transmitter, a transmission control means, and a battery. The pneumatic sensor detects a tire pressure. The acceleration sensor detects acceleration generated by rotation of a wheel. For instance, the acceleration sensor detects an acceleration generated when a wheel rotates, such as acceleration in a direction of centrifugal force of a wheel and acceleration in a direction of a circumference of a wheel.

The transmitter transmits wheel information which is information including an inherent sensor ID and tire-pressure information representing the tire pressure detected by the pneumatic sensor and as a radio signal. The sensor ID is inherent discrimination information which specifies a tire-pressure sensor unit. The transmission control means controls the transmission timing of the wheel information by the transmitter based on the acceleration detected by the acceleration sensor. To an electrical load (element which operates with an electric power) disposed in the tire-pressure sensor unit, an electric power is supplied from the battery.

It is desired that the life time of this battery is secured to be the same extent as the life-time of a vehicle. Therefore, it is necessary to suppress a battery consumption required for transmission of the wheel information as much as possible.

For example, the wheel information is received by a tire-pressure notification device disposed on the vehicle body side, and is used for reporting information of a tire pressure. Generally, the tire-pressure notification device does not operate, when an ignition switch is turned off. Therefore, when it is configured not to transmit the wheel information in a situation where the tire-pressure notification device is not operating, battery consumption of a tire-pressure sensor unit can be suppressed. In order to be thus configured, the transmission control means comprises a first transmission control means, an accumulation means, and a second transmission control means.

The first transmission control means makes the transmitter periodically transmit the wheel information, when the acceleration detected by the acceleration sensor is larger than a running-judgment threshold value. The acceleration sensor detects the acceleration generated by rotation of a wheel. Therefore, the first transmission control means can make the transmitter periodically transmit the wheel information, only when the vehicle is running. Thereby, the battery consumption can be suppressed.

When the tire-pressure sensor unit is attached to a running wheel, the wheel information can be transmitted by the first transmission control means. However, when the tire-pressure sensor unit is attached to a spare wheel, the acceleration detected by the acceleration sensor does not become larger than the running-judgment threshold value since the spare wheel does not rotate.

The spare wheel receives force in a front-and-rear direction at the time of the acceleration and deceleration of a vehicle, receives force in a transverse direction or a roll direction at the time of turning of the vehicle, and receives force in an up-and-down direction at the time of a vertical vibration of the vehicle. The force acted on the spare wheel in association with such vehicle movements is referred to as external force. The external force contains an acceleration component in a direction in which the acceleration sensor can detect acceleration, although its magnitude is minute.

Then, when the acceleration detected by the acceleration sensor becomes not more than the running-judgment threshold value, the accumulation means accumulates an acceleration-correlated amount which has a correlation with the magnitude of acceleration, and acquires its accumulated value. Therefore, the acceleration-correlated amount according to the acceleration detected by the acceleration sensor is accumulated by the external force acting on the spare wheel (external force acting on the tire-pressure sensor unit fixed to the spare wheel). When the vehicle is running, since the external force acts on the spare wheel, the acceleration-correlated amount is being accumulated. This acceleration-correlated amount only has to be a value set as two or more steps according to the acceleration at least, and may be set up in a non-step manner, for example. For instance, the value of the detected acceleration itself can also be used as the acceleration-correlated amount.

For instance, when using an acceleration-correlated amount which is set larger as the acceleration detected by the acceleration sensor becomes larger, the larger the acceleration-correlated amount accumulated in a certain period is, the more surely it can be estimated that there is a track record that the vehicle has run in a certain period.

Using this, the second transmission control means makes the transmitter transmit the wheel information, when it is estimated that there is a track record that the vehicle has run based on the comparison result of the accumulated value acquired by the accumulation means with the running-track-record-judgment threshold value. Thereby, even when the tire-pressure sensor unit is attached to the spare wheel, the wheel information can be transmitted based on the vehicle running track record. Therefore, in accordance with the present invention, the tire-pressure sensor unit disposed in any one of the running wheels and the spare wheel can transmit the wheel information, while suppressing battery consumption.

The feature of one aspect of the present invention is in that:

said second transmission control means is configured to compare said accumulated value accumulated during a set period (T2) with said running-track-record-judgment threshold value whenever said set period has passed (S25), and to make said transmitter transmit said wheel information when it is presumed that there is a track record that said vehicle has run in said set period based on the comparison result, and said set period (T2) has been set to be longer than a period (T1) in which said first transmission control means makes said transmitter periodically transmits said wheel information.

In the above-mentioned aspect of the present invention, the second transmission control means compares the accumulated value accumulated in the set period with the running-track-record-judgment threshold value whenever the set period has passed. And, based on the comparison result, it estimates whether there is any track record that the vehicle has run in the set period, and make the transmitter transmit the wheel information when it is estimated that there is a track record that the vehicle has run. This set period is set to a period which is longer than the period in which the first transmission control means makes the transmitter periodically transmit the wheel information.

The wheel information of the spare wheel is transmitted by the second transmission control means. Therefore, as compared with the period in which the wheel information on the running wheel is transmitted, the period in which the wheel information on the spare wheel is transmitted is set to a longer period. Thereby, the wheel information of the spare wheel can be prevented from being transmitted at an unnecessarily high frequency, and battery consumption can be suppressed.

The feature of another aspect of the present invention is in that:

said wheel information includes transmission discrimination information, based on which it can be discriminated whether it is the wheel information transmitted by said first transmission control means or the wheel information transmitted by said second transmission control means.

For instance, when the tire-pressure notification device disposed on the vehicle body side reports the tire-pressure information in distinction between the running wheels and the spare wheel, it is necessary to distinguish whether the wheel information received by the tire-pressure notification device is the wheel information transmitted from the tire-pressure sensor unit disposed in the spare wheel or the wheel information transmitted from the tire-pressure sensor unit disposed in the running wheel.

In the above-mentioned aspect of the present invention, the wheel information includes transmission discrimination information, based on which it can be discriminated whether it is the wheel information transmitted by the first transmission control means or the wheel information transmitted by the second transmission control means. For instance, in the tire-pressure sensor unit disposed in the spare wheel, even when the vehicle is running, the acceleration detected by the acceleration sensor does not become larger than the running-judgment threshold value. For this reason, it can be judged that the wheel information transmitted by the first transmission control means is the wheel information transmitted from the tire-pressure sensor unit disposed in the running wheel. Therefore, it can be judged that the tire-pressure sensor unit which transmitted the wheel information is disposed in the running wheel, when it is found that it is the wheel information transmitted by the first transmission control means based on the transmission discrimination information. Thereby, it becomes easy for the tire-pressure notification device to judge whether the received wheel information is the wheel information of the running wheel or the wheel information of the spare wheel.

The feature of further another aspect of the present invention is in that:

said transmission discrimination information is information representing the acceleration detected by said acceleration sensor or the magnitude of said acceleration.

In the above-mentioned aspect of the present invention, information representing the acceleration detected by the acceleration sensor or the magnitude of the acceleration is used as the transmission discrimination information. Therefore, it can be judged that the wheel information is transmitted by the first transmission control means when the acceleration is larger than the running-judgment threshold value, and it can be judged that the wheel information is transmitted by the second transmission control means when the acceleration is not more than the running-judgment threshold value. Moreover, when information representing the magnitude of acceleration is used as the transmission discrimination information, information representing whether the acceleration is larger than the running-judgment threshold value or not can be used as the transmission discrimination information. In this case, the data amount to be transmitted can be reduced.

The present invention can be applied not only to a tire-pressure sensor unit, but also to a tire-pressure notification device disposed on the vehicle body side, The feature of this tire-pressure notification device (50, 100) is in that a tire-pressure notification device which receives said wheel information transmitted from the tire-pressure sensor unit and reports said tire-pressure information to a driver in distinction between running wheels and a spare wheel, comprising:

a spare wheel specifying means (S31 to S37) for specifying a sensor ID of a tire-pressure sensor fixed to a spare wheel of the vehicle among sensor IDs included in the wheel information transmitted from many and unspecified tire-pressure sensor units, wherein;

said spare wheel specifying means uses at least said transmission discrimination information as information for specifying said sensor ID.

In accordance with the tire-pressure notification device according to the present invention, the spare wheel specifying means specifies the sensor ID of the tire-pressure sensor fixed to the spare wheel of the vehicle among the sensor IDs included in the wheel information transmitted from many and unspecified tire-pressure sensor units. Therefore, it becomes easy to judge whether the received wheel information is the wheel information of the running wheel or the wheel information of the spare wheel.

The present invention can be applied also to a vehicle which can mount, as a spare wheel, a wheel to which the tire-pressure sensor unit is fixed. The feature of this vehicle is in that a mark (M) for specifying a fixing position in a circumference direction of said spare wheel is formed in the spare wheel loading portion which is formed in said vehicle body for fixing and mounting said spare wheel so that said tire-pressure sensor unit is arranged in a specific position of said vehicle body.

The tire-pressure sensor unit disposed in the spare wheel detects external force with the acceleration sensor, and transmits the wheel information. Moreover, when the spare wheel is fixed to the spare wheel loading portion of the vehicle body, the sensitivity of the acceleration sensor for detecting the external force changes depending on the position where the tire-pressure sensor unit is arranged. Therefore, when the spare wheel is fixed to the spare wheel loading portion, it is preferable to determine the fixing position in the circumference direction of the spare wheel so that the acceleration sensor is arranged in a position where the external force can be detected properly.

Therefore, in the vehicle according to the present invention, the mark which specifies the fixing position in the circumference direction of the spare wheel is formed in the spare wheel loading portion for fixing and mounting the spare wheel so that the tire-pressure sensor unit is arranged in the specific position of the vehicle body. Therefore, the spare wheel can be fixed to the position where the acceleration sensor can detect the external force properly. Thereby, the tire-pressure sensor unit disposed in the spare wheel can transmit the wheel information which properly reflects the running track record of the vehicle.

In addition, in the above-mentioned explanation, in order to assist in understanding the present invention, although the reference signs used in embodiments in parenthesis are attached to the configuration of the invention corresponding to the embodiments, respective constituent elements of the invention are not limited to the embodiments specified with the above-mentioned reference signs.

DESCRIPTION OF EMBODIMENTS

Figure 1:
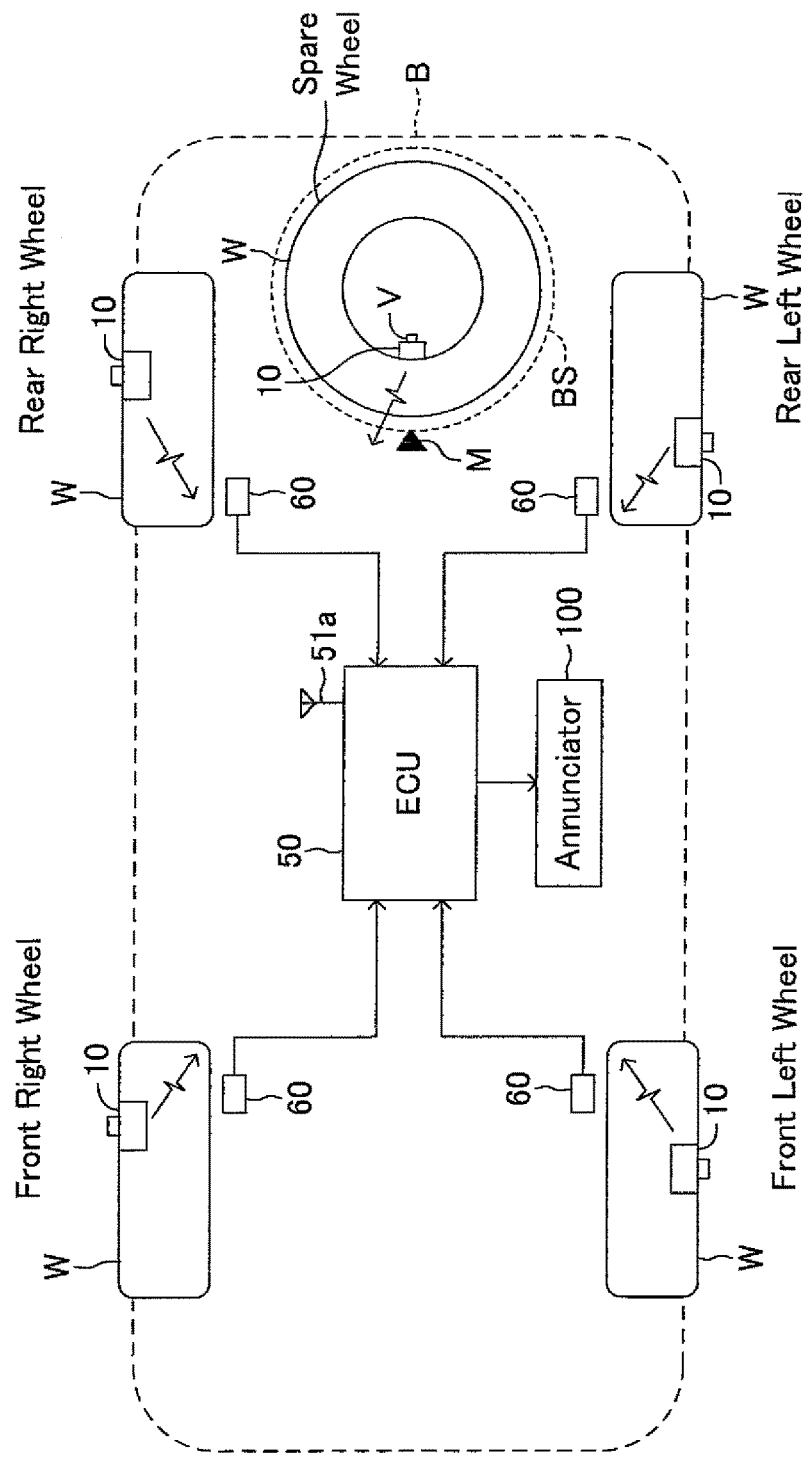
FIG. 1 is a schematic diagram of a tire-pressure monitoring system according to an embodiment of the present invention.

Hereafter, the "tire-pressure monitor system for a vehicle equipped with a tire-pressure sensor unit and a tire-pressure notification device" according to one embodiment of the present invention will be explained using drawings. FIG. 1 shows a schematic diagram of the tire-pressure monitoring system for a vehicle.

Figure 2:
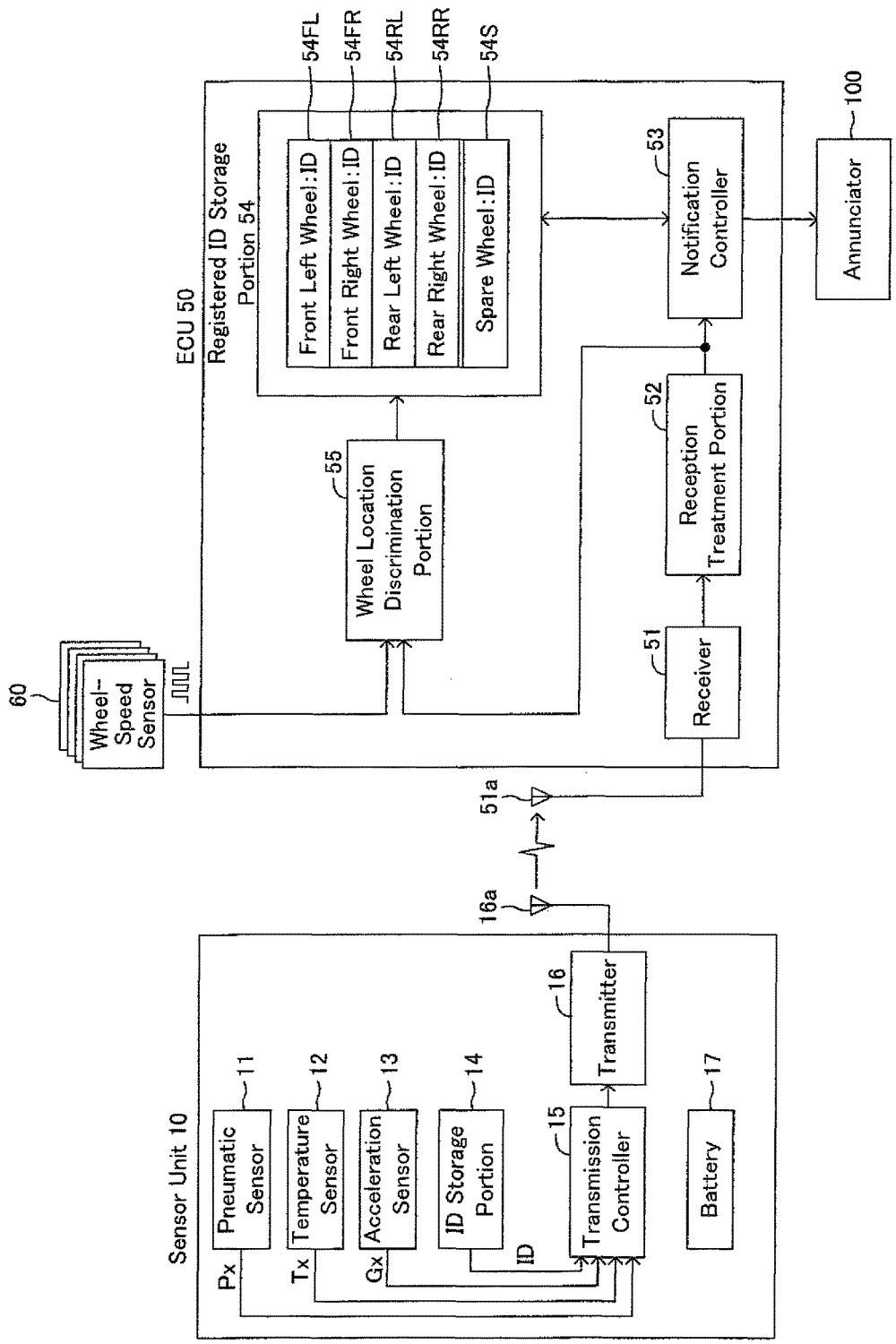
FIG. 2 is a functional block diagram in a sensor unit and an ECU.

The tire-pressure monitor system is a system for reporting air pressure information of a tire to a driver, and comprises a tire-pressure sensor unit 10 (hereafter, referred to a sensor unit 10) fixed to each wheel W, a tire-pressure information control unit (hereafter, referred to as an ECU 50) fixed to a vehicle body B and an annunciator 100. The configuration which consists of the ECU 50 and the annunciator 100 corresponds to the tire-pressure notification device according to the present invention. FIG. 2 shows a functional block diagram in the sensor unit and the ECU 50. Since all the sensor units 10 disposed in respective wheels W have an identical function, one of them is shown in FIG. 2. Although the sensor unit 10 will be explained hereafter, this sensor unit 10 is disposed commonly to 5 wheels including a spare wheel.

Figure 7:
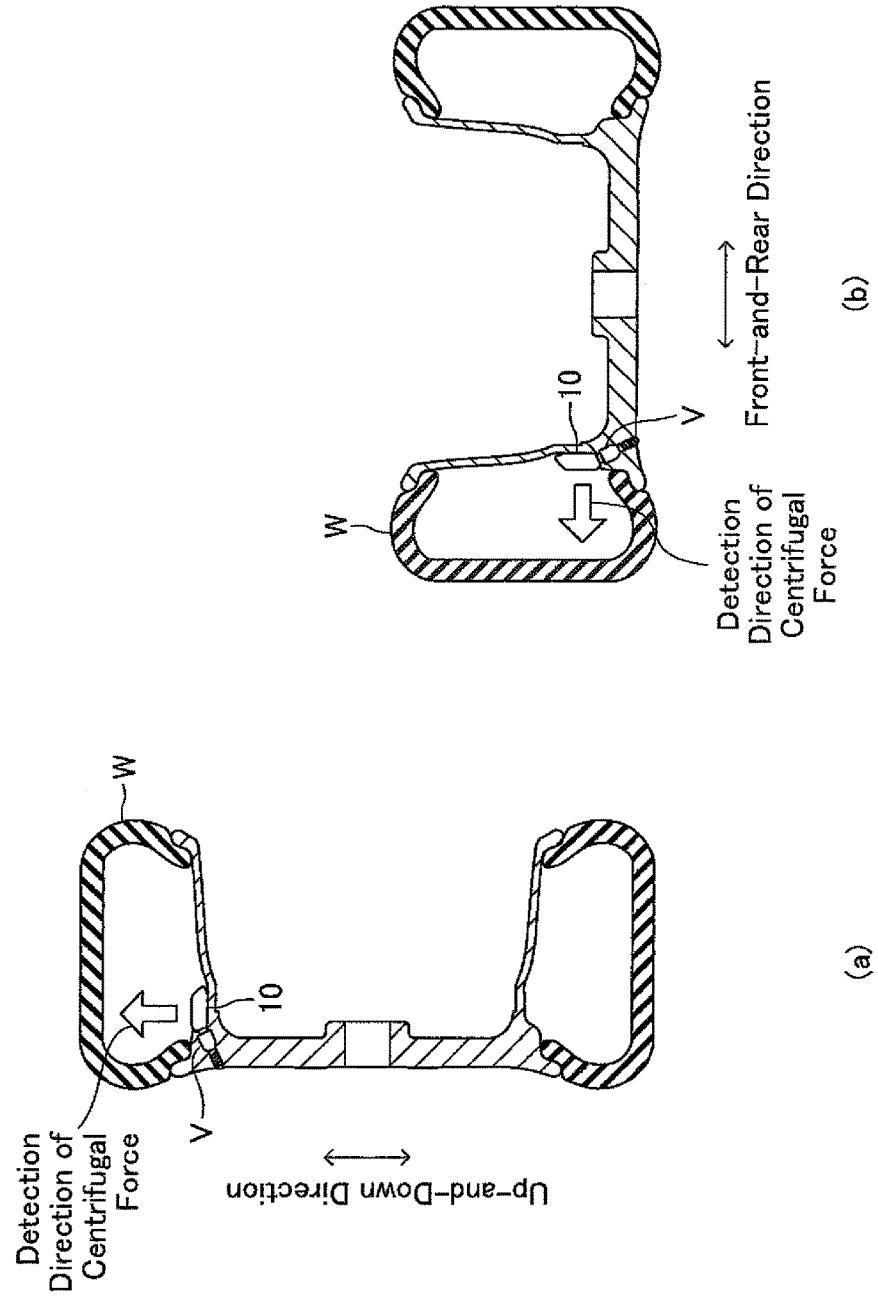
FIG. 7 is a drawing for showing the loading conformation of a spare wheel.

The sensor unit 10 is attached to a tire air injection valve V of a wheel W, as shown in FIG. 7. The sensor unit 10 comprises a pneumatic sensor 11, a temperature sensor 12, an acceleration sensor 13, an ID storage portion 14, a transmission controller 15, a transmitter 16, and a battery 17, as shown in FIG. 2. These constituent elements 11 to 17 are stored and unitized in one casing. The pneumatic sensor 11 detects the air pressure of a tire and outputs a detection signal which represents the air pressure Px to the transmission controller 15. The temperature sensor 12 detects the temperature of a tire and outputs a detection signal which represents the tire temperature Tx to the transmission controller 15. The acceleration sensor 13 detects the acceleration in a centrifugal force direction of the wheel W and outputs a detection signal which represents the acceleration Gx to the transmission controller 15. The ID storage portion 14 is a non-volatile memory which memorizes the sensor IDs which are discrimination information of the sensor units 10, and outputs the sensor IDs to the transmission controller 15.

The transmission controller 15 comprises a microcomputer as a principal part, and generates transmission data containing the air pressure Px detected by the pneumatic sensor 11, the tire temperature Tx detected by the temperature sensor 12, the acceleration Gx detected by the acceleration sensor 13 and the sensor ID memorized in the ID storage portion 14, and outputs the same to the transmitter 16. Moreover, the transmission controller 15 performs a transmission control routine, which will be mentioned later, to set up the transmission timing of the transmission data, and outputs the transmission data to the transmitter 16 at this set-up transmission timing. In this case, the tire temperature Tx and the acceleration Gx contained in the transmission data do not need to be data representing the detected value themselves, and may be data representing the magnitude of the detected values (data representing whether the detected values are larger than threshold values or not) in order to reduce communication data volume.

When the transmission data outputted from the transmission controller 15 is inputted, the transmitter 16 converts the transmission data into a radio signal and transmits the radio signal to the ECU 50 through a transmission antenna 16*a*. The transmitter 16 transmits the above-mentioned radio signal at the timing when the transmission data is inputted. Therefore, the timing when the transmitter 16 transmits the radio signal is controlled by the transmission controller 15. This transmitter is configured to be able to transmit only to the ECU 50 (bidirectional communication is impossible), and unilaterally transmits the above-mentioned radio signal. Hereafter, the information transmitted as a radio signal from the transmitter 16 (corresponding to the transmission data outputted from the transmission controller 15 to the transmitter 16) will be referred to as wheel information.

The battery 17 supplies electric power for operation to respective electrical loads in the sensor unit 10, and functions as a power supply.

Next, the ECU 50 will be explained. The ECU 50 comprises a microcomputer and a communication circuit as a principal part, and comprises a receiver 51, a reception treatment portion 52, a notification controller 53, a registered ID storage portion 54 and a wheel location discrimination portion 55, from a functional perspective. Moreover, the ECU 50 is connected with the annunciator 100 disposed near a driver's seat. The ECU 50 starts its operation when an ignition switch is turned on, and it stops its operation when the ignition switch is turned off.

The receiver 51 receives the radio signal transmitted from each sensor unit 10 through the reception antenna 51*a*. This receiver 51 receives the radio signals transmitted from the sensor units 10 fixed to the wheels W of not only the vehicle, but also many and unspecified other vehicles. The reception treatment portion 52 extracts data representing the sensor ID, the air pressure Px, the tire temperature Tx and the acceleration Gx from the radio signal, whenever the receiver 51 receives the radio signal. The reception treatment portion 52 outputs data representing the sensor ID, the air pressure Px and the tire temperature Tx to the notification controller 53, and outputs data representing the sensor ID and the acceleration Gx to the wheel location discrimination portion 55 at the timing when the receiver 51 receives the radio signal.

The notification controller 53 creates annunciation data which represents the air pressures Px of five wheels of the vehicle with respect to each wheel location based on the data inputted from the reception treatment portion 52 and the sensor IDs of the five wheels (four running wheels and one spare wheel) memorized in the registered ID storage portion 54.

The registered ID storage portion 54 is a non-volatile memory which memorizes the sensor IDs of the sensor units 10 attached to the wheels W of the vehicle in association with their wheel locations. The registered ID storage portion 54 comprises a front left wheel ID storage area 54FL which memorizes the sensor ID assigned to the sensor unit 10 of a front left wheel, a front right wheel ID storage area 54FR which memorizes the sensor ID assigned to the sensor unit 10 of a front right wheel, a rear left wheel ID storage area 54RL which memorizes the sensor ID assigned to the sensor unit 10 of a rear left wheel, a rear right wheel ID storage area 54RR which memorizes the sensor ID assigned to the sensor unit 10 of a rear right wheel, and a spare wheel ID storage area 54S which memorizes the sensor ID assigned to the sensor unit 10 of a spare right wheel. Hereafter, the sensor IDs memorized by the registered ID storage portion 54 will be referred to as registered sensor IDs.

The notification controller 53 refers to a correspondence relation between the registered sensor IDs and the wheel locations memorized in the registered ID storage portion 54, creates the annunciation data which represents the air pressures Px of the five wheels including the spare wheel according to their wheel locations based on the data inputted from the reception treatment portion 52, and outputs the created annunciation data to the annunciator 100. Moreover, the notification controller 53 compares the air pressure Px with a proper evaluation value Pref for every wheels, and outputs insufficient air pressure wheel location data which identifies the wheel location where the air pressure is insufficient to the annunciator 100 when the air pressure Px is less than the proper evaluation value Pref.

In addition, the notification controller 53 also judges whether the tire temperature Tx has become an unusually elevated temperature based on the inputted tire temperature Tx, and outputs a tire overheat information to another vehicle controller which is not shown when an overheat status of a tire is detected. Moreover, the notification controller 53 may be configured to output overheated tire location data which specifies the wheel location of the overheated tire to the annunciator 100. Moreover, the notification controller 53 may be configured to correct the proper evaluation value Pref for judging the propriety of a tire pressure based on the tire temperature Tx.

The annunciator 100 comprises a display disposed in the location which can be sighted from a drivers seat, a display driver which drives the display, and a display microcomputer which controls the display driver, and displays a tire-pressure monitoring screen image on the display according to the annunciation data outputted from the notification controller 53, for example.

Figure 3:
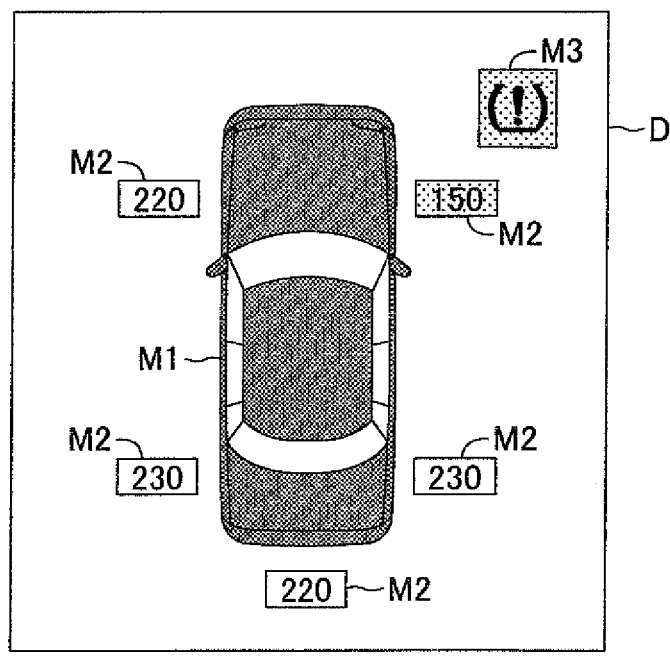
FIG. 3 is a drawing for showing a display screen image which an annunciator displays.

FIG. 3 represents a tire-pressure monitoring screen image D displayed on the display of the annunciator 100. A vehicle body mark M1 representing a top-view pattern of a vehicle body, air pressure value display portions M2 which are disposed corresponding to respective wheel locations and display numerical values of the tire pressures, and a warning mark M3 for calling a driver's attention are displayed on the tire-pressure monitoring screen image D. This air pressure value display portion M2 is disposed also for the spare wheel. This example shows a tire-pressure monitoring screen image D in a type of a vehicle mounting a spare wheel in a rear trunk of its vehicle body.

The annunciator 100 displays the numerical values of the air pressures on the air pressure value display portions M2 based on the annunciation data inputted from the notification controller 53. Moreover, in the case where it is judged that the shortage of air pressure has occurred based on the insufficient air pressure wheel location data, it changes the display mode of the air pressure value display portion M2 at the wheel location (for instance, its background color and character color may be changed) and turns on the warning mark M3. The warning mark M3 is configured to be able to be sighted by a driver only when it is turned on, and to be unable to be sighted by a driver when it is turned off. Therefore, a driver can recognize which wheel lacks for air pressure, along with its air pressure value.

The wheel location discrimination portion 55 is a functional portion for automatically distinguishing which wheel W has the sensor unit 10 that had transmitted the radio signal received by the receiver 51, that is, to which wheel W the sensor unit 10 specified by the sensor ID contained in the radio signal is attached, by estimation, and identifying its wheel location based on the discrimination result, and registering its sensor ID in the registered ID storage portion 54.

The wheel location discrimination portion 55 starts its operation when the vehicle speed reaches at a setting speed (for instance, 20 km/h) for the first time after the ignition switch was turned on, and ends its operation when the discrimination of wheel locations has been completed.

At the time of shipment, a vehicle has a correct relation between the wheel locations and the registered sensor IDs memorized by the registered ID storage portion 54. However, when a tire rotation is performed or a wheel W is replaced with another one thereafter, the registered situation (relation between the registered sensor Ds and the wheel locations) becomes different from an actual relation between the sensor IDs and the wheel locations. The wheel location discrimination portion 55 is prepared in order to cope with such an issue.

The wheel location discrimination portion 55 is connected with wheel-speed sensors 60. The wheel-speed sensors 60 are respectively prepared on the vehicle body side corresponding to the respective wheels (running wheels) W, and output a predetermined number of pulse signals while the corresponding wheel W rotates one revolution. The wheel-speed sensors 60 attached to the vehicle in the present embodiment output a pulse signal 96 times while the corresponding wheel W rotates one revolution. That is, a pulse signal is outputted whenever the wheel W rotates a constant angle (3.75 deg. (=360/96)).

The wheel location discrimination portion 55 starts counting the pulse signal outputted by the wheel-speed sensor 60 at an arbitrary timing, and returns the pulse count value back to "1" when the pulse count value exceeds "96", and will resume counting. The pulse count value thus converted into a value of "96" or less is referred to as a pulse number. For instance, when the pulse count value increases as 95, 96, 97, 98, 99 . . . , the pulse number will be set up so as to change as 95, 96, 1, 2, 3 . . . . The pulse number comes to a value representing the reminder resulted from a division of the pulse count value by the number of the pulse signals for one revolution of the wheel.

As will be mentioned later, the sensor unit 10 disposed in a running wheel transmits the radio signal in the location where its own turning position is the uppermost, that is, in the location where the gravitational-acceleration component detected by the acceleration sensor 13 becomes −1G. Therefore, the pulse number sampled when the radio signal transmitted by the sensor unit 10 is received will be constant fundamentally, in a case where the sensor unit 10 and the wheel-speed sensor 60 are disposed in a common wheel W.

Figure 5:
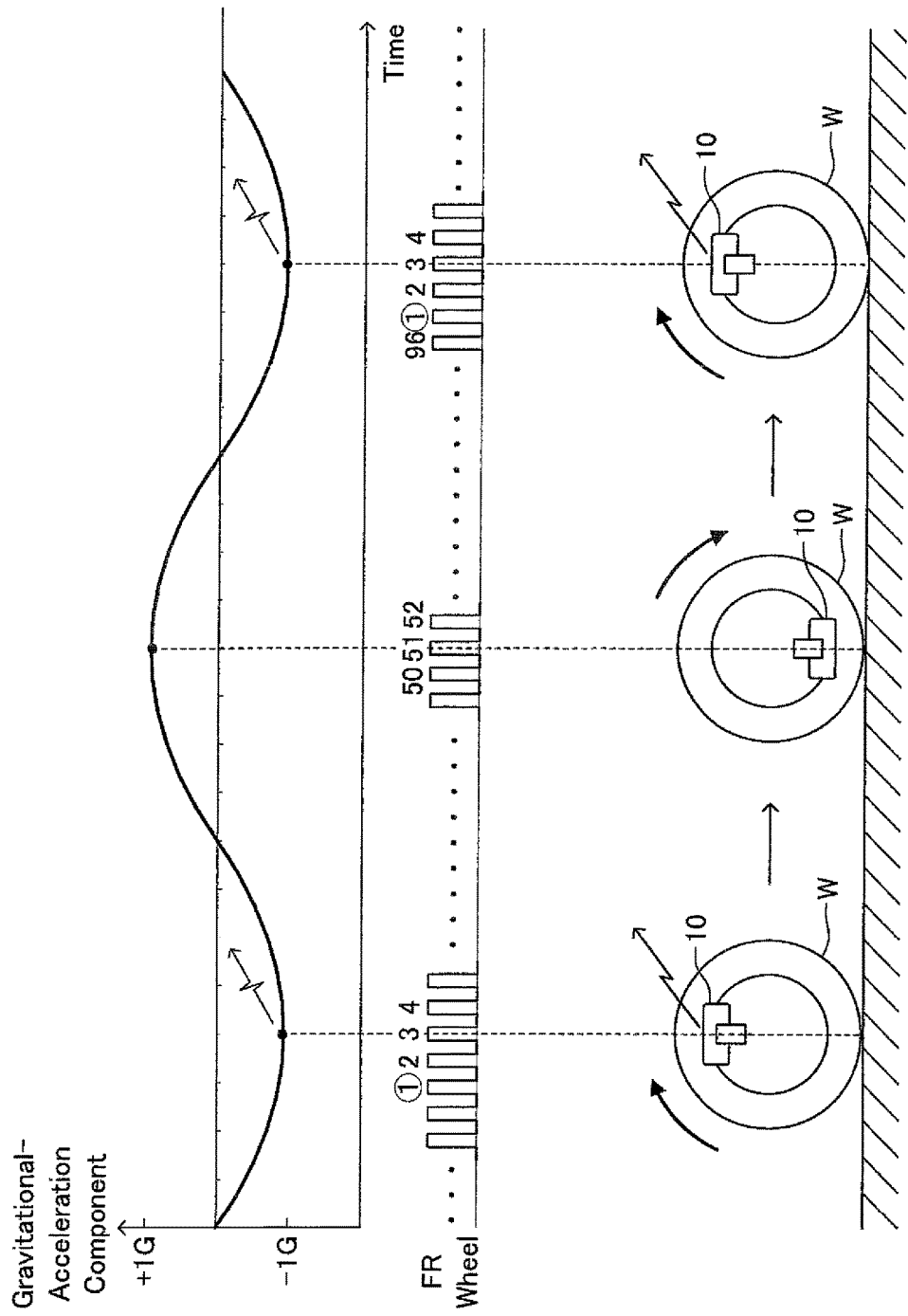
FIG. 5 is a drawing for showing an image of a relation between the turning position of a sensor unit and a pulse number.

FIG. 5 is a drawing for showing an image of a relation between the turning position of the sensor unit 10 and the pulse number in an arbitrary wheel. This example shows that the pulse number of a front right wheel shows a constant value "3" when the turning position of the sensor unit 10 is the uppermost.

Respective wheels W do not necessarily rotate at the same speed as one another, and mutual rotational speeds become different due to an inner ring difference, an outer wheel difference and a slip, etc. For this reason, the sampled pulse number fluctuates, when the sensor unit 10 and the wheel-speed sensor 60 do not correspond to a common wheel W.

Using such a principle, the wheel location discrimination portion 55 reads the pulse numbers of the wheel-speed sensors 60 of the four wheels and memorizes the pulse numbers of the respective wheel-speed sensors 60 at that time in association with the sensor IDs included in the received wheel information whenever it receives the wheel information transmitted from many and unspecified sensor units 10 (sensor unit 10 of another vehicle may be included).

That is, the pulse numbers are sampled. And, based on the pulse number of each wheel-speed sensor 60 sampled for every sensor Ds, the wheel W having the wheel-speed sensor 60 with the smallest variation in the pulse number is specified as the wheel W to which its own sensor unit 10 is attached. Thereby, the relation between the sensor IDs of the sensor units 10 attached to the running wheels in the vehicle and the wheel locations is determined. The wheel location discrimination portion 55 memorizes thus determined relation of the sensor IDs and the wheel locations in the registered ID storage portion 54.

Moreover, the wheel location discrimination portion 55 also acquires the acceleration Gx included in the wheel information transmitted from each sensor unit 10, and specifies the sensor ID of the sensor unit 10 attached to the spare wheel of the vehicle based on the acceleration Gx. Since this treatment is related to a treatment by the transmission controller 15 of the sensor unit 10, this treatment will be mentioned later. Here, the detail of the treatment by the transmission controller 15 will be explained first.

As mentioned above, since the sensor unit 10 does not comprise a reception function, a configuration for transmitting wheel information in response to a demand from the ECU 50 cannot be adopted. For this reason, the sensor unit 10 transmits the wheel information unilaterally. The ECU 50 continues to stop its operation during the ignition switch is turned off, as mentioned above. Therefore, it makes no sense to transmit the wheel information from the sensor unit 10 during the ignition switch is turned off, and the life-time of the battery 17 will be shortened on the contrary.

Then, the sensor unit 10 used in the present embodiment judges a rotation status of the wheel W based on the acceleration Gx, and transmits the wheel information periodically when it is judged that the wheel W is rotating (the vehicle is running). Thereby, the wheel information can be prevented from being transmitted during the ignition switch is turned off. Such a technique works when the wheel W is a running wheel. However, when the wheel is a spare wheel, the wheel information cannot be transmitted by such a technique since the wheel W does not rotate.

Figure 4:
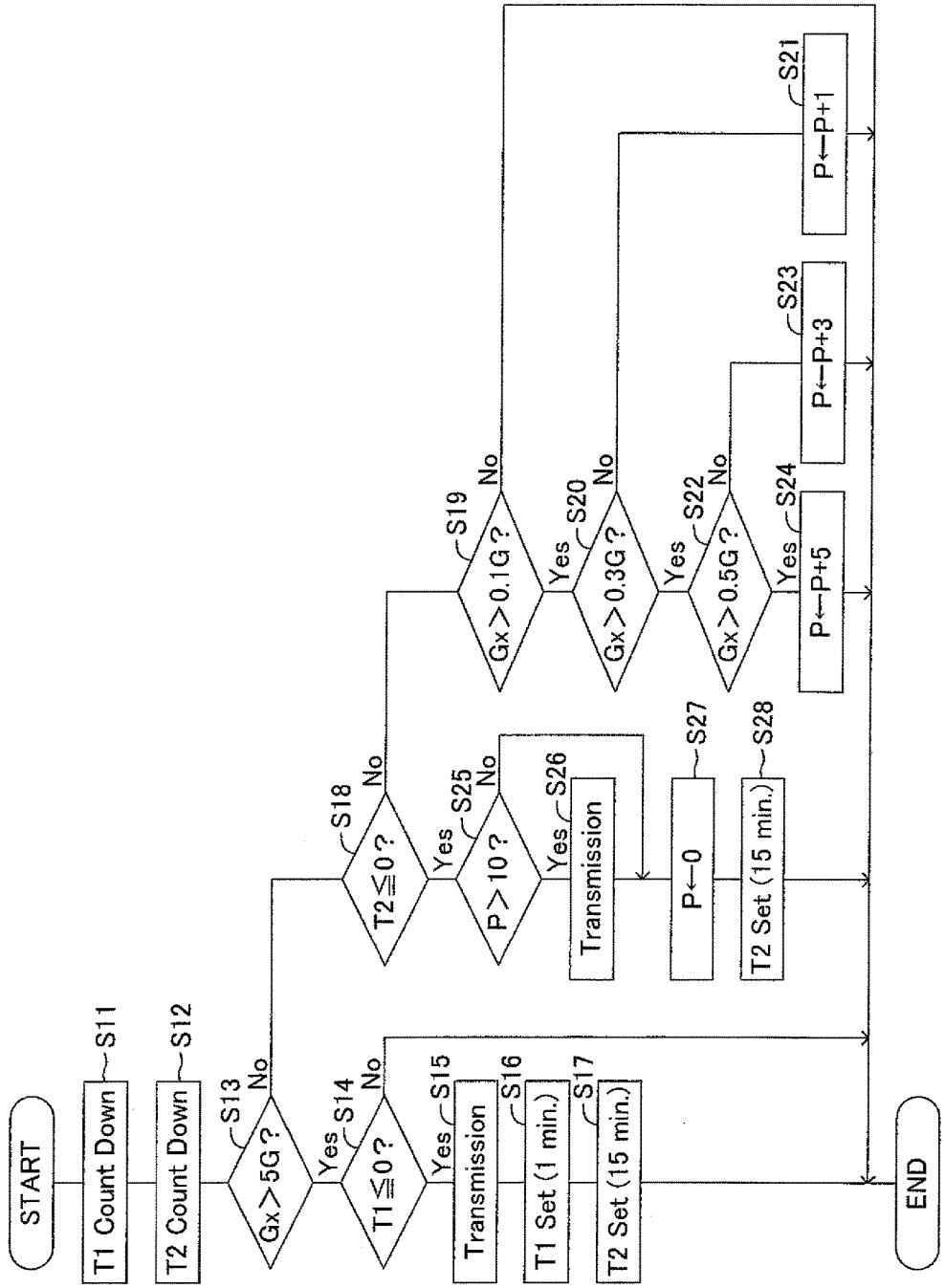
FIG. 4 is a flowchart for showing a transmission control routine.

In order to cope with such an issue, the sensor unit 10 additionally has a function to transmit the wheel information even when the sensor unit 10 is attached to the spare wheel. FIG. 4 shows a transmission control routine which the transmission controller 15 carries out. The transmission controller 15 repeatedly carries out the transmission control routine in a predetermined operation period during an electric power is supplied from the battery 17, that is, until the power supply capability of the battery 17 is lost. In this transmission control routine, step S18 to step S28 are treatments for making it possible to transmit the wheel information also for a spare wheel.

When the transmission control routine is started, the transmission controller 15 counts down the value of a first timer T1 in step S11. The first timer T1 is a clock timer for setting up a period in which the sensor unit 10 disposed in the running wheel transmits the wheel information while the running wheel is rotating, and its measuring period is set to 1 minute in the present embodiment. Although an initial value of the first timer T1 may be any value, for easy understanding, it is set to 1 minute in the explanation here. Therefore, in step S11, the value of the first timer T1 is decremented by a predetermined value from the initial value of 1 minute.

Then, the transmission controller 15 counts down the value of a second timer T2 in step S12. The second timer T2 is a clock timer for setting up a period in which the sensor unit 10 disposed in the spare wheel transmits the wheel information while the vehicle is running, and its measuring period is set to 15 minutes in the present embodiment. The value of the second timer T2 represents a remaining time until it reaches the set period (15 minutes). The set period (measuring time) of the second timer T2 is set as longer than the set period (measuring time) of the first timer T1. Although an initial value of the second timer T2 may be any value, for easy understanding, it is set to 15 minutes in the explanation here. Therefore, in step S12, the value of the second timer T2 is decremented by a predetermined value from the initial value of 15 minutes.

Then, in step S13, the transmission controller 15 reads the acceleration Gx detected by the acceleration sensor 13, and judges whether the acceleration Gx is larger than 5G. This G represents a gravitational acceleration on the earth. Therefore, 5G represents 5 times of the gravitational acceleration. In the present embodiment, when the acceleration Gx is larger than 5G (i.e., when the acceleration Gx in a direction of centrifugal force of the sensor unit 10 is larger than 5G), it is judged that the wheel W is rotating (the vehicle is running). Therefore, 5G is set up as a running-judgment threshold value.

During the vehicle is running, although the running wheels (front-and-rear right-and-left wheels) rotate, but a spare wheel does not rotate. For this reason, in the case of the sensor unit 10 prepared in the spare wheel, the judgment in step S13 necessarily becomes "No." On the other hand, in the case of the sensor unit 10 disposed in the running wheel, the judgment in step S13 is determined according to its own rotation status.

First, a case when judged as "Yes" in step S13 will be explained. Only in the sensor unit 10 disposed in a running wheel, such a judgment may occur. When the transmission controller 15 judged as "Yes" in step S13, it judges whether the value of the first timer T1 is not more than zero in step S14. That is, it is judged whether the first timer T1 detects that 1 minute has passed.

The transmission controller 15 once ends the transmission control routine, when the first timer T1 does not detect that 1 minute has passed (S14: No). The transmission controller 15 repeats the transmission control routine in a predetermined operation period. Such a treatment is repeated, and the transmission controller 15 will advance the treatment to step S15 when the first timer T1 detects that 1 minute has passed (S14: Yes).

The transmission controller 15 transmits the wheel information in step S15. That is, it outputs the transmission data to the transmitter 16 and makes the transmitter 16 transmit the wheel information. In this case, the transmission controller 15 extracts a gravitational-acceleration component from the acceleration Gx by filtering treatment, waits until the gravitational-acceleration component becomes −1G, and outputs the transmission data to the transmitter 16. Since the acceleration sensor 13 rotates along with the wheel W to which itself is attached, the acceleration Gx in a direction of centrifugal force ripples according to its own turning position (turning position of the sensor unit 10), by the effect of gravity. This rippling component of the acceleration Gx in a direction of centrifugal force is the gravitational-acceleration component. The gravitational-acceleration component changes in a range of −1G to +1G while the wheel W rotates one revolution, as shown in FIG. 5. The gravitational-acceleration component becomes −1G when the turning position of the acceleration sensor 13 comes to the uppermost position. Therefore, the transmission controller 15 make the transmitter 16 transmit the wheel information at the timing when the sensor unit 10 is at the uppermost position.

Then, the transmission controller 15 sets the first timer T1 to the set period (1 minute) in step S16. Then, the transmission controller 15 sets the second timer T2 to the set period (15 minutes) in step S17. In this case, the second timer T2 is newly set to the set period value regardless of its current value.

In the sensor unit 10 disposed in the running wheel, during the vehicle is running (while Gx>5G), the transmission controller 15 repeats such a treatment (S11-S17). In this case, although the transmission timing of the wheel information is the timing when the sensor unit 10 is at the uppermost position and differs from the set period of the first timer T1, in fact, it is almost the same as the timing when the set period of the first timer T1 is up since the wheel W is rotating. That is, the time period required for the sensor unit 10 to reach the uppermost position after the set period of the first timer T1 is up is very short as compared with the set period (1 minute) of the first timer T1. Therefore, it can be said that the transmission of the wheel information is carried out in a period of about 1 minute in step S15. In this step S15, the functional portion of the transmission controller 15 which transmits the wheel information corresponds to the first transmission control means in the present invention.

In addition, in the present embodiment, in order that the wheel location discrimination portion 55 of the ECU 50 distinguishes the wheel location to which the sensor unit 10 is attached, the transmission timing of the wheel information is set to the timing when the turning position of the sensor unit 10 becomes the uppermost. Therefore, when the wheel location discrimination portion 55 is not configured to distinguish the wheel location, it may be configured that the wheel information is transmitted when the set period of the first timer T1 is up (T1≤0). Moreover, the turning position of the sensor unit 10 for determining the transmission timing of the wheel information is not limited to the uppermost, and only has to be a specific position which is set arbitrarily.

The sensor unit 10 disposed in the running wheel can transmit the wheel information periodically only while the vehicle is running, through the treatments in steps S11 to S17. On the other hand, as for the sensor unit 10 disposed in the spare wheel, since the wheel W does not rotate even when the vehicle is running, the treatments after step S18 will be carried out according to the "No" judgment in step S13.

The transmission controller 15 advances the treatment to step S18, when the acceleration Gx is not more than 5G. The transmission controller 15 judges whether the value of the second timer T2 has become not more than zero in step S18. That is, it judges whether the second timer T2 detects that 15 minutes have passed. When the second timer T2 does not detect that 15 minutes have passed (S18: No), the transmission controller 15 reads the acceleration Gx detected by the acceleration sensor 13, in step S19, and judges whether the acceleration Gx is larger than 0.1G (0.1 time of the gravitational acceleration). When the acceleration Gx is not more than 0.1G (S19: No), the transmission controller 15 once ends the transmission control routine.

When the acceleration Gx is larger than 0.1G (S19: Yes), the transmission controller 15 judges whether the acceleration Gx is larger than 0.3G (0.3 time of the gravitational acceleration) in step S20. When the acceleration Gx is not more than 0.3G (S20: No) (i.e., when the acceleration Gx is larger than 0.1G and not more than 0.3G), the transmission controller 15 increases a point P by a value of "1" in step S21, and once ends the transmission control routine. This point P represents the magnitude of the extent that the vehicle is estimated to be running. The initial value of the point P is set as zero.

When the acceleration Gx is larger than 0.3G (S20: Yes), the transmission controller 15 judges whether the acceleration Gx is larger than 0.5G (0.5 time of the gravitational acceleration) in step S22. When the acceleration Gx is not more than 0.5G (S22: No), that is, the acceleration Gx is larger than 0.3G and not more than 0.5G, the transmission controller 15 increases the point P by a value of "3" in step S23, and when the acceleration Gx is larger than 0.5G (S22: Yes), it increases the point P by a value "5" in step S24. This point P corresponds to the acceleration-correlated amount in the present invention, which is correlated with the magnitude of the acceleration Gx.

While the second timer T2 does not count up, that is, for 15 minutes, such an accumulation of the point P is repeated. This period in which the point P is accumulated is equal to the operation period (predetermined set period) of the transmission control routine. When the vehicle is running, although the spare wheel does not rotate, it receives the force in the front-and-rear direction when the vehicle accelerates and decelerates, receives the force in a transverse direction or a roll direction when the vehicle turns, and receives the force in an up-and-down direction when the vehicle vibrates in a vertical direction. The force acted on the spare wheel in association with such vehicle movements is referred to as external force.

Although the acceleration sensor 13 disposed in the sensor unit 10 outputs a detection signal according to the acceleration in the direction of centrifugal force of the wheel W, such external force contains its component in the direction of centrifugal force with the magnitude according to the direction of the external force. Therefore, even in the sensor unit 10 disposed in the spare wheel, an acceleration is detected by the acceleration sensor 13 although its magnitude is minute.

The transmission controller 15 accumulates the point P in a period set up by the second timer T2 in step S19 to step S24 and thereby acquires the accumulated point P as a measure for judging whether there is any track record that the vehicle has run in the period. In addition, since steps S19, S20 and S22 are treatments for judging the extent of the external force which the wheel W received, it is desirable to use the magnitude, i.e., a value which shows its absolute value, as the acceleration Gx compared with a threshold value in the step. In this case, in addition to the direction of centrifugal force, the force acting in its opposite direction, i.e., a direction toward the center of the wheel W, can be also detected as external force.

When it was judged that the value of the second timer T2 became not more than zero (i.e., when the second timer T2 detected that 15 minutes had passed) in step S18, the transmission controller 15 judges whether the accumulated point P is larger than a value of "10" in step S25. This value "10" is only an example and is the running-track-record-judgment threshold value for judging whether there is any track record that the vehicle has run in the 15 minutes.

When the accumulated point P is larger than the vehicle running-track-record-judgment threshold value (S25: Yes), the transmission controller 15 transmits the wheel information in step S26. That is, it outputs the transmission data to the transmitter 16, and makes the transmitter 16 transmit the wheel information. On the other hand, when the accumulated point P is not more than the running-track-record-judgment threshold value (S25: No), the treatment in step S26 is skipped. In step S26, the functional portion of the transmission controller 15 which transmits the wheel information corresponds to the second transmission control means according to the present invention.

Then, the transmission controller 15 clears the value of the point P to zero in step S27, sets the second timer T2 to the set period (15 minutes), and once ends the transmission control routine.

The transmission controller 15 repeatedly performs the transmission control routine in a predetermined operation period. Therefore, in the sensor unit 10 disposed in the running wheel, the wheel information is transmitted in a predetermined period (about 1 minute) only during the vehicle is running. Moreover, in the sensor unit 10 disposed in the spare wheel, when it is estimated that there is a track record that the vehicle has run during the latest set periods (15 minutes), the wheel information is transmitted. Therefore, even though the spare wheel which does not rotate by the vehicle being running, it can transmit the wheel information from the sensor unit 10 in a cycle of 15 minutes only when the vehicle is running. As a result, also in the sensor unit 10 disposed in any of the running wheels and the spare wheel, the periodical transmission of the wheel information is prevented from being continued wastefully, and consumption of the battery 17 can be suppressed. Thereby, the life-time of the sensor unit 10 (life-time of the battery 17) can be secured to be the same extent as the life-time of the vehicle.

Moreover, although it becomes impossible even for the running wheel to perform the periodical transmission in every 1 minute when the vehicle is running at a minute low speed (Gx≤5G), the wheel information is transmitted 15 minutes later since it is rare that the vehicle continues to run at a minute low speed for a long time and the point P will exceed the vehicle running-track-record-judgment threshold value within 15 minutes even if such a situation occurred. Therefore, the tire pressure can be monitored.

Moreover, the spare wheel does not have a possibility of blowing out and a reduction of the tire pressure is due to a spontaneously leak. Therefore, even though the transmission period of the wheel information on the spare wheel is set to a long term, i.e., 15 minutes, a demand for monitoring the tire-pressure of the spare wheel can be satisfied sufficiently. Thereby, consumption of the battery 17 can be suppressed.

Moreover, the sensor unit 10 in the present embodiment transmits the wheel information including the information representing the acceleration Gx. For this reason, in the wheel location discrimination portion 55 of the ECU 50, it becomes easy to judge whether the sensor unit 10 specified by the sensor ID is disposed in the running wheel or the spare wheel.

When another vehicle exists near the vehicle, the ECU 50 also receives the wheel information transmitted from the sensor unit 10 of another vehicle. Therefore, it is necessary to distinguish the wheel information (sensor ID) transmitted from the sensor unit 10 of the vehicle among many and unspecified wheel information (sensor IDs). As mentioned above, as for the sensor unit 10 disposed in the running wheel, it can be distinguished not only between the vehicle and another vehicle, but also the wheel locations, by sampling the pulse number obtained by counting the pulse signal outputted by the wheel-speed sensor 60.

On the other hand, as for the sensor unit 10 disposed in the spare wheel, the target for discrimination can be narrowed down to only the sensor unit 10 (sensor ID) whose acceleration Gx is not more than 5G by referring to the acceleration information included in the wheel information. That is, since the wheel information transmitted in step S15 is certainly transmitted from the sensor unit 10 disposed in the running wheel, the sensor unit 10 (sensor ID) whose acceleration Gx is larger than 5G can be excluded from the candidate of the sensor unit 10 (sensor ID) disposed in the spare wheel. Therefore, it becomes easy to distinguish the sensor unit 10 (sensor ID) disposed in the spare wheel among many and unspecified sensor units 10 (sensor IDs) by using the acceleration information.

Moreover, as for the sensor unit 10 disposed in the spare wheel, the transmission period of the wheel information in the period during which the vehicle is running is set to a long value, i.e., 15 minutes. For this reason, even if the wheel information transmitted from the sensor unit 10 disposed in the spare wheel of another vehicle is received, it is unlikely that the wheel information transmitted from the same sensor unit 10 is received again 15 minutes later. Using this, the wheel location discrimination portion 55 specifies the sensor unit 10 (sensor ID) disposed in the spare wheel.

Figure 6:
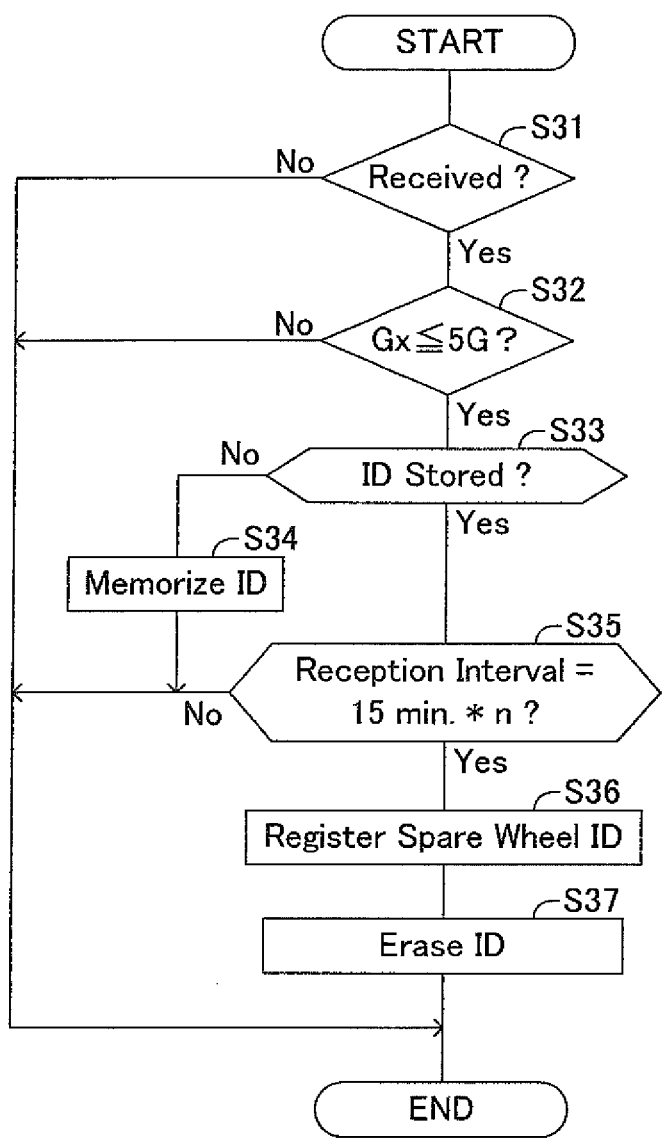
FIG. 6 is a flowchart for showing a spare wheel ID discrimination routine.

FIG. 6 shows a spare wheel ID discrimination routine which the wheel location discrimination portion 55 carries out. The wheel location discrimination portion 55 starts the spare wheel ID discrimination routine, for example, after the wheel locations of the sensor units 10 disposed in respective running wheels of the vehicle are distinguished and the sensor IDs are memorized in the registered ID storage portion 54. Alternatively, it carries out the spare wheel ID discrimination routine in parallel to a discrimination treatment of the wheel location of the sensor unit 10 disposed in the running wheel. The wheel location discrimination portion 55 repeats the spare wheel ID discrimination routine in a predetermined operation period, and ends this routine when it specifies the sensor ID of the sensor unit 10 disposed in the spare wheel.

In step S31, the wheel location discrimination portion 55 judges whether the wheel information has been received, and repeats this judgment in a predetermined operation period until the wheel information is received. And, when the wheel information is received (S31: Yes), the wheel location discrimination portion 55 will judge whether the acceleration Gx is not more than 5G in step S32 based on the acceleration information included in the wheel information. When the acceleration Gx is larger than 5G, the received wheel information is not the wheel information transmitted from the sensor unit 10 disposed in the spare wheel. In this case, the wheel location discrimination portion 55 once ends the present routine.

When the wheel information in which the acceleration Gx is not more than 5G is received, the wheel location discrimination portion 55 judges whether the sensor ID included in the wheel information has been memorized in step S33. When the sensor ID has not been memorized, the wheel location discrimination portion 55 memorizes this sensor ID in step S34, and once ends this routine. This sensor ID is temporarily memorized in the memory only while this routine is being repeated. In this case, the wheel location discrimination portion 55 measures the elapsed time from the time of memorizing for every memorized sensor ID.

The wheel location discrimination portion 55 repeats such a treatment, and when it judges that the wheel information including the already memorized sensor ID is received in step S33, it advances the treatment to step S35. In step S35, the wheel location discrimination portion 55 judges whether the elapsed time from the time of memorizing the sensor ID to the present time is an integral multiple of 15 minutes, as for the sensor ID included in the wheel information received this time. That is, it is judged whether the reception interval of a common sensor ID is an integral multiple of 15 minutes or not. When the wheel location discrimination portion 55 judges as "No", the wheel location discrimination portion 55 once ends this routine, and repeats the same treatment.

On the other hand, when it was judged as "Yes" in step S35, the wheel location discrimination portion 55 estimates that the sensor ID is the sensor ID of the sensor unit 10 disposed in the spare wheel of the vehicle, and registers (memorizes) the sensor ID into the spare wheel ID storage area 54S of the registered ID storage portion 54 in step S36. Then, the wheel location discrimination portion 55 erases the sensor ID temporarily memorized for spare wheel discrimination in step S37, and ends this routine (it does not repeat the same).

In accordance with this spare wheel ID discrimination routine, the sensor ID of the sensor unit 10 disposed in the spare wheel can be easily distinguished based on the acceleration information included in the wheel information and the reception interval.

In addition, although the acceleration information representing the value of the acceleration Gx is included in the wheel information in the present embodiment, the acceleration information included in the wheel information may be data representing only whether it is larger than 5G which is the running-track-record-judgment threshold value (for instance, 1 bit data). In this case, the spare wheel ID discrimination treatment in the ECU 50 can be carried out while reducing the amount of transmission data of the sensor unit 10.

Moreover, in the present embodiment, the acceleration information is used as transmitter discrimination information for identifying whether the wheel information transmitted from the sensor unit 10 is the wheel information transmitted in step S15 (wheel information transmitted based on the vehicle running judgment) or the wheel information transmitted in step S26 (wheel information transmitted based on the accumulated point). However, it may be configured that dedicated transmitter discrimination information is superimposed on the wheel information, in place of the acceleration information. In this case, the wheel location discrimination portion 55 only has to judge in which step the wheel information is transmitted in step S32, based on the transmitter discrimination information.

The sensor unit 10 disposed in the spare wheel detects the external force acting on the sensor unit 10 with the acceleration sensor 13, and transmits the wheel information. Moreover, when the spare wheel is fixed at the spare wheel loading portion BS in the vehicle body B (for instance, rear trunk of the vehicle body), the sensitivity of the acceleration sensor 13 for detecting the external force changes depending on the position (position in a circumference direction of the wheel W) where the sensor unit 10 is arranged. Therefore, when the spare wheel is fixed at the spare wheel loading portion BS, it is preferable to determine its fixing position in a circumference direction of the spare wheel so that the acceleration sensor 13 is arranged in a position where the external force can be detected properly.

As embodiments for mounting a spare wheel on a vehicle, a vertical type as shown in FIG. 7 (*a*) and a flat type as shown in FIG. 7 (*b*) can be exemplified, for example. Since the acceleration sensor 13 in the present embodiment is in a type which detects the acceleration in a direction of centrifugal force of the wheel W, in the case of the vertical type (a), the up-and-down acceleration due to the vertical vibration (a pitch movement, a HEIB movement, etc.) of a vehicle body can be efficiently detected when the sensor unit 10 is disposed in the uppermost position or the lowermost position. Moreover, in the case of the flat type (b), the acceleration in the front-and-rear direction due to the acceleration and deceleration of a vehicle body can be efficiently detected when the sensor unit 10 is disposed in the foremost position or the backmost position in the front-and-rear direction of a vehicle body.

Then, in the present embodiment, as shown in FIG. 1, the mark M which specifies the position in a circumference direction of air supply valve V (air feed port) that is the position of the sensor unit 10 is formed in the spare wheel loading portion BS. For example, the mark M may be formed by paint, and may be formed by processing the metal plate of the spare wheel loading portion BS (for instance, press processing, etc.), and may be formed by attaching another part to the spare wheel loading portion BS. Based on this mark M, a driver determines the position in a circumference direction of a spare wheel, and fixes the spare wheel to the spare wheel loading portion BS. Thereby, the sensor unit 10 is arranged in the specific position of the vehicle body, and the acceleration sensor 13 can detect external force successfully. As a result, the sensor unit 10 prepared in the spare wheel can transmit the wheel information which reflects the running track record of the vehicle much more properly.

Although the tire-pressure monitor system according to the present embodiment has been explained as mentioned above, the present invention is not limited to the above-mentioned embodiments, and various modifications are possible for the present invention unless it deviates from the objective of the present invention.

For instance, the set period of the first timer T1 and the set period of the second timer T2 can be set arbitrarily. In this case, it is preferable that the set period of the second timer T2 is set longer than the set period of the first timer T1.

Moreover, for example, although the point P was divided into four steps (P=0, P=1, P=3, P=5) in the present embodiment, what is necessary is just two or more steps. In this case, the acceleration Gx itself may be set up as the point P.

Moreover, although it is configured that a display screen image reports the tire-pressure information in the present embodiment, it may be configured that any reporting means other than the display screen image, for instance, a phonetic announce device, reports the tire-pressure information.

Moreover, although the pulse signal outputted by the wheel-speed sensor 60 is the directly inputted to the ECU 50 in the present embodiment, it may be configured that the information representing the number of the outputs of pulse signals is introduced into the ECU 50 from a brake operating unit (not shown) which calculates the wheel speed by being inputted the pulse signal outputted by the wheel-speed sensor 60, for instance. The brake operating unit counts the number of the pulse signals outputted by the wheel-speed sensor 60 in a predetermined time period (for instance, 30 milliseconds), and outputs information (wheel-speed information) representing the count number in a predetermined time period. Therefore, the ECU 50 can accumulate the count number of the pulse signals outputted by brake operating unit outputs, and can detect the number of the pulse signals.

REFERENCE SIGNS LIST

10: sensor unit, 11: pneumatic sensor, 12: temperature sensor, 13: acceleration sensor, 14: ID storage portion, 15: transmission controller, 16: transmitter, 16*a*: transmission antenna, 17: battery, 50: ECU, 51: receiver, 51*a*: reception antenna, 52: reception treatment portion, 53: notification controller, 54: registered ID storage portion, 55: wheel location discrimination portion, 60: wheel-speed sensor, 100: annunciator, B: vehicle body, BS: spare wheel loading portion, M: mark, W: wheel (running wheel, spare wheel).

The invention claimed is:

1. A tire-pressure sensor unit being fixed to and disposed on a wheel of a vehicle and comprising:
    a pneumatic sensor which detects a tire pressure,
    an acceleration sensor which detects acceleration generated by rotation of a wheel,
    a transmitter for transmitting wheel information which is information including tire-pressure information representing the tire pressure detected by said pneumatic sensor and an inherent sensor ID as a radio signal,
    a processor and memory configured to control a transmission timing of said wheel information by said transmitter based on the acceleration detected by said acceleration sensor, and
    a battery disposed as an internal electrical power source for the tire-pressure sensor unit,
    wherein;
    said processor and memory are configured to:
    in a first transmission process, make said transmitter periodically transmit said wheel information when the acceleration detected by said acceleration sensor is larger than a running-judgment threshold value,
    accumulate an acceleration-correlated amount which is correlated with the magnitude of the acceleration detected by said acceleration sensor and acquiring an accumulated value thereof when said acceleration is not more than said running-judgment threshold value,
    in a second transmission process, make said transmitter transmit said wheel information when said processor determines that there is a track record that said vehicle has run based on the comparison result between said acquired accumulated value and a running-track-record-judgment threshold value.

2. The tire-pressure sensor unit according to claim 1, wherein;
    during the second transmission process, the processor is configured to compare said accumulated value accumulated during a set period with said running-track-record-judgment threshold value whenever said set period has passed, and to make said transmitter transmit said wheel information when said processor determines that there is a track record that said vehicle has run in said set period based on the comparison result, and
    said set period has been set to be longer than a period in which said during the first transmission process, the processor makes said transmitter periodically transmits said wheel information.

3. The tire-pressure sensor unit according to claim 2, wherein;
    said wheel information includes transmission discrimination information, based on which said processor can determine whether the transmitted wheel information is wheel information transmitted by said first transmission process or wheel information transmitted by said second transmission process.

4. A vehicle which can mount, as a spare wheel, a wheel to which the tire-pressure sensor unit according to claim 3 is fixed, wherein;
    a mark for specifying a fixing position in a circumference direction of said spare wheel is formed in the spare wheel loading portion which is formed in said vehicle body for fixing and mounting said spare wheel so that said tire-pressure sensor unit is arranged in a specific position of said vehicle body.

5. A tire-pressure notification device which receives said wheel information transmitted from the tire-pressure sensor unit according to claim 3 and reports said tire-pressure information to a driver in distinction between running wheels and a spare wheel, comprising:
    a second processor and memory configured to specify a sensor ID of a tire-pressure sensor fixed to a spare wheel of the vehicle among sensor IDs included in the wheel information transmitted from many and unspecified tire-pressure sensor units, wherein;
    said second processor uses at least said transmission discrimination information as information for specifying said sensor ID.

6. A vehicle which can mount, as a spare wheel, a wheel to which the tire-pressure sensor unit according to claim 2 is fixed, wherein;
    a mark for specifying a fixing position in a circumference direction of said spare wheel is formed in the spare wheel loading portion which is formed in said vehicle body for fixing and mounting said spare wheel so that said tire-pressure sensor unit is arranged in a specific position of said vehicle body.

7. The tire-pressure sensor unit according to claim 1, wherein;
    said wheel information includes transmission discrimination information, based on which said processor can determine whether the transmitted wheel information is wheel information transmitted by said first transmission process or wheel information transmitted by said second transmission process.

8. The tire-pressure sensor unit according to claim 7, wherein;
    said transmission discrimination information is information representing the acceleration detected by said acceleration sensor or the magnitude of said acceleration.

9. A tire-pressure notification device which receives said wheel information transmitted from the tire-pressure sensor unit according to claim 8 and reports said tire-pressure information to a driver in distinction between running wheels and a spare wheel, comprising:
    a second processor and memory configured to specify a sensor ID of a tire-pressure sensor fixed to a spare wheel of the vehicle among sensor IDs included in the wheel information transmitted from many and unspecified tire-pressure sensor units, wherein;
    said second processor uses at least said transmission discrimination information as information for specifying said sensor ID.

10. A vehicle which can mount, as a spare wheel, a wheel to which the tire-pressure sensor unit according to claim 8 is fixed, wherein;
    a mark for specifying a fixing position in a circumference direction of said spare wheel is formed in the spare wheel loading portion which is formed in said vehicle body for fixing and mounting said spare wheel so that said tire-pressure sensor unit is arranged in a specific position of said vehicle body.

11. A tire-pressure notification device which receives said wheel information transmitted from the tire-pressure sensor unit according to claim 7 and reports said tire-pressure information to a driver in distinction between running wheels and a spare wheel, comprising:
    a second processor and memory configured to specify a sensor ID of a tire-pressure sensor fixed to a spare wheel of the vehicle among sensor IDs included in the wheel information transmitted from many and unspecified tire-pressure sensor units, wherein;

said second processor uses at least said transmission discrimination information as information for specifying said sensor ID.

12. A vehicle which can mount, as a spare wheel, a wheel to which the tire-pressure sensor unit according to claim 7 is fixed, wherein;

a mark for specifying a fixing position in a circumference direction of said spare wheel is formed in the spare wheel loading portion which is formed in said vehicle body for fixing and mounting said spare wheel so that said tire-pressure sensor unit is arranged in a specific position of said vehicle body.

13. A vehicle which can mount, as a spare wheel, a wheel to which the tire-pressure sensor unit according to claim 1 is fixed, wherein;

a mark for specifying a fixing position in a circumference direction of said spare wheel is formed in the spare wheel loading portion which is formed in said vehicle body for fixing and mounting said spare wheel so that said tire-pressure sensor unit is arranged in a specific position of said vehicle body.

* * * * *